United States Patent
Unterthiner et al.

(10) Patent No.: US 12,524,676 B2
(45) Date of Patent: Jan. 13, 2026

(54) END-TO-END TRAINING OF NEURAL NETWORKS FOR IMAGE PROCESSING

(71) Applicant: Google LLC, Mountain View, CA (US)

(72) Inventors: Thomas Unterthiner, Berlin (DE); Alexey Dosovitskiy, Berlin (DE); Aravindh Mahendran, Berlin (DE); Dirk Weissenborn, Berlin (DE); Jakob D. Uszkoreit, Berlin (DE); Jean-Baptiste Cordonnier, Lausanne (CH)

(73) Assignee: Google LLC, Mountain View, CA (US)

( * ) Notice: Subject to any disclaimer, the term of this patent is extended or adjusted under 35 U.S.C. 154(b) by 1080 days.

(21) Appl. No.: 17/538,891

(22) Filed: Nov. 30, 2021

(65) Prior Publication Data
US 2022/0172066 A1    Jun. 2, 2022

Related U.S. Application Data

(60) Provisional application No. 63/164,996, filed on Mar. 23, 2021, provisional application No. 63/119,559, filed on Nov. 30, 2020.

(51) Int. Cl.
*G06N 3/084* (2023.01)
*G06F 18/2113* (2023.01)
(Continued)

(52) U.S. Cl.
CPC ......... *G06N 3/084* (2013.01); *G06F 18/2113* (2023.01); *G06N 3/02* (2013.01);
(Continued)

(58) Field of Classification Search
CPC .......... G06N 3/045; G06N 3/084; G06N 3/08; G06N 3/044; G06N 20/00; G06N 3/04;
(Continued)

(56) References Cited

U.S. PATENT DOCUMENTS

| | | | |
|---|---|---|---|
| 2021/0019502 A1* | 1/2021 | Girard | G06T 7/60 |
| 2022/0108478 A1* | 4/2022 | Houlsby | G06N 3/08 |
| 2024/0378439 A1* | 11/2024 | van den Oord | G06N 20/00 |

OTHER PUBLICATIONS

Guo, Pei, and Ryan Farrell. "Aligned to the object, not to the image: A unified pose-aligned representation for fine-grained recognition." 2019 IEEE Winter Conference on Applications of Computer Vision (WACV). IEEE, 2019, 10 pages. (Year: 2019).*

(Continued)

*Primary Examiner* — Sumati Lefkowitz
*Assistant Examiner* — Ryan P Potts
(74) *Attorney, Agent, or Firm* — Fish & Richardson P.C.

(57) ABSTRACT

Methods, systems, and apparatus, including computer programs encoded on computer storage media, for training a neural network to process images. One of the methods includes obtaining a training image; processing the training image using a first subnetwork to generate, for each of a plurality of first image patches of the training image, a relevance score; generating, using the relevance scores, one or more second image patches of the training image by performing one or more differentiable operations on the relevance scores; processing the one or more second image patches using a second subnetwork to generate a prediction about the training image; determining an error of the training network output; and generating a parameter update for the first subnetwork, comprising backpropagating gradients determined according to the error of the training network output through i) the second subnetwork, ii) the one or more differentiable operations, and iii) the first subnetwork.

20 Claims, 3 Drawing Sheets

(51) Int. Cl.
*G06N 3/02* (2006.01)
*G06N 3/045* (2023.01)
*G06N 20/00* (2019.01)
*G06V 10/771* (2022.01)
*G06V 20/00* (2022.01)

(52) U.S. Cl.
CPC ............ *G06N 3/045* (2023.01); *G06N 20/00* (2019.01); *G06V 10/771* (2022.01); *G06V 20/00* (2022.01)

(58) Field of Classification Search
CPC ...... G06N 3/0455; G06N 3/0464; G06N 3/02; G06N 3/0985; G06V 10/82; G06V 10/764; G06V 2201/03; G06V 30/19173; G06V 10/25; G06V 40/161; G06V 10/771; G06V 20/00; G06V 10/40; G06T 2207/20084; G06T 2207/20081; G06T 7/11; G06T 5/60; G06T 7/0014; G06T 9/002; G06T 2207/20021; G06F 18/2113
See application file for complete search history.

(56) References Cited

OTHER PUBLICATIONS

Wang, Zhouxia, et al. "Multi-label image recognition by recurrently discovering attentional regions." Proceedings of the IEEE international conference on computer vision, 2017, 9 pages. (Year: 2017).*

Zheng, Yang-Yang, et al. "Probability fusion decision framework of multiple deep neural networks for fine-grained visual classification." IEEE Access 7 (2019): 122740-122757. (Year: 2019).*

Berthet, Quentin, et al. "Learning with Differentiable Perturbed Optimizers." ArXiv.org, 2020, arxiv.org/abs/2002.08676v1. Accessed May 9, 2025, 14 pages. (Year: 2020).*

Katharopoulos, Angelos, and François Fleuret. "Processing Megapixel Images with Deep Attention-Sampling Models." ArXiv.org, 2019, arxiv.org/abs/1905.03711. Accessed May 9, 2025, 17 pages. (Year: 2019).*

Sumbul, Gencer, Ramazan Gokberk Cinbis, and Selim Aksoy. "Multisource region attention network for fine-grained object recognition in remote sensing imagery." IEEE Transactions on Geoscience and Remote Sensing 57.7 (2019): 4929-4937. (Year: 2019).*

Abernethy et al., "Perturbation techniques in online learning and optimization," Perturbations, Optimization, and Statistics, 2016, 31 pages.

Anderson et al., "Bottom-Up and Top-Down Attention for Image Captioning and Visual Question Answering," Proceedings of the IEEE Conference on Computer Vision and Pattern Recognition (CVPR), Jun. 2018, pp. 6077-6086.

Angles et al., "MIST: Multiple Instance Spatial Transformer Networks," arXiv, Dec. 18, 2018, 9 pages.

Ba et al., "Multiple object recognition with visual attention," arXiv, Apr. 23, 2015, 10 pages.

Bay et al., "Speeded-up robust features (surf)," Computer Vision Image Understanding, Jun. 2008, 110(3):346-359.

Berthet et al., "Learning with Differentiable Pertubed Optimizers," Advances in Neural Information Processing Systems, 2020, 12 pages.

Blondel et al., "Fast Differentiable Sorting and Ranking," Proceedings of the 37th International Conference on Machine Learning, 2020, 10 pages.

Cai et al., "Higher-Order Integration of Hierarchical Convolutional Activations for Fine-Grained Visual Categorization," Proceedings of the IEEE International Conference on Computer Vision (ICCV), Oct. 2017, pp. 511-520.

Chen et al., "Attention to Scale: Scale-Aware Semantic Image Segmentation," Proceedings of the IEEE Conference on Computer Vision and Pattern Recognition (CVPR), Jun. 2016, pp. 3640-3649.

Cordonnier et al., "On the Relationship between Self-Attention and Convolutional Layers," arXiv, Jan. 10, 2020, 18 pages.

Cuturi et al., "Differentiable Ranking and Sorting using Optimal Transport," Advances in Neural Information Processing Systems, 2019, 11 pages.

Dosovitskiy et al., "An Image is Worth 16x16 Words: Transformers for Image Recognition at Scale," arXiv, Oct. 22, 2020, 21 pages.

Elsayed et al., "Saccader: Improving Accuracy of Hard Attention Models for Vision," Advances in Neural Information Processing Systems, 2019, 13 pages.

Eslami et al., "Attend, Infer, Repeat: Fast Scene Understanding with Generative Models," Advances in Neural Information Processing Systems, 2016, 9 pages.

Fu et al., "Look Closer to See Better: Recurrent Attention Convolutional Neural Network for Fine-Grained Image Recognition," Proceedings of the IEEE Conference on Computer Vision and Pattern Recognition (CVPR), Jul. 2017, pp. 4438-4446.

Girshick et al., "Rich Feature Hierarchies for Accurate Object Detection and Semantic Segmentation," Proceedings of the IEEE Conference on Computer Vision and Pattern Recognition (CVPR), Jun. 2014, pp. 580-587.

Girshick, "Fast r-cnn," Proceedings of the IEEE International Conference on Computer Vision (ICCV), Dec. 2015, pp. 1440-1448.

He et al., "Deep Residual Learning for Image Recognition," Proceedings of the IEEE Conference on Computer Vision and Pattern Recognition (CVPR), Jun. 2016, pp. 770-778.

He et al., "Mask R-CNN," Proceedings of the IEEE International Conference on Computer Vision (ICCV), Oct. 2017, pp. 2961-2969.

Hosang et al., "Learning Non-Maximum Suppression," Proceedings of the IEEE Conference on Computer Vision and Pattern Recognition (CVPR), Jul. 2017, pp. 4507-4515.

Ilse et al., "Attention-based Deep Multiple Instance Learning," Proceedings of the 35th International Conference on Machine Learning, 2018, 10 pages.

Jaderberg et al., "Spatial Transformer Networks," Advances in Neural Information Processing Systems, 2015, 9 pages.

Katharopoulos et al., "Processing Megapixel Images with Deep Attention-Sampling Models," Proceedings of the 36th International Conference on Machine Learning, 2019, 10 pages.

Kingma et al., "Adam: A Method for Stochastic Optimization," arXiv, Jul. 23, 2015, 15 pages.

Kuen et al., "Recurrent Attentional Networks for Saliency Detection," Proceedings of the IEEE Conference on Computer Vision and Pattern Recognition (CVPR), Jun. 2016, pp. 3668-3677.

Larsson et al., "Using Fourier Descriptors and Spatial Models for Traffic Sign Recognition," Image Analysis, 2011, pp. 238-249.

Li et al., "Dynamic Computational Time for Visual Attention," Proceedings of the IEEE International Conference on Computer Vision (ICCV), Oct. 2017, pp. 1199-1209.

Li et al., "Patch Transformer for Multi-tagging Whole Slide Histopathology Images," Medical Image Computing and Computer Assisted Intervention, Oct. 2019, pp. 532-540.

Li et al., "Tell Me Where to Look: Guided Attention Inference Network," Proceedings of the IEEE Conference on Computer Vision and Pattern Recognition (CVPR), Jun. 2018, pp. 9215-9223.

Lin et al., "Bilinear CNN Models for Fine-Grained Visual Recognition," Proceedings of the IEEE International Conference on Computer Vision (ICCV), Dec. 2015, pp. 1449-1457.

Liu et al., "Fully convolutional attention localization networks: Efficient attention localization for fine-grained recognition," arXiv, Mar. 21, 2017, 10 pages.

Loshchilov et al., "Decoupled weight decay regularization," Presented at Seventh International Conference on Learning Representations, New Orleans, LA, USA, May 6-9, 2019, 18 pages.

Lowe, "Distinctive image features from scale-invariant keypoints," International Journal of Computer Vision, Jan. 5, 2004, 28 pages.

Ma et al., "A-Lamp: Adaptive Layout-Aware Multi-Patch Deep Convolutional Neural Network for Photo Aesthetic Assessment," Proceedings of the IEEE Conference on Computer Vision and Pattern Recognition (CVPR), Jul. 2017, pp. 4535-4544.

Mnih et al., "Recurrent Models of Visual Attention," Advances in Neural Information Processing Systems, 2014, 9 pages.

(56) References Cited

OTHER PUBLICATIONS

Moghimi et al., "Boosted convolutional neural networks," British Machine Vision Conference, Sep. 2016, 13 pages.

Ren et al., "Faster R-CNN: Towards real-time object detection with region proposal networks," IEEE Trans. Pattern Anal. Mach. Intell., Jun. 2017, 39(6):1137-1149.

Schmidhuber et al., "Learning to generate artificial fovea trajectories for target detection," International Journal of Neural Systems, 1991, pp. 125-134.

Sharma et al., "Action Recognition using Visual Attention," arXiv, Nov. 12, 2015, 11 pages.

Uijlings et al., "Selective Search for Object Recognition," Int. J. Comput. Vision, Apr. 2, 2013, 14 pages.

Vaswani et al., "Attention is All you Need," Advances in Neural Information Processing Systems, 2017, 11 pages.

Wah et al., "The Caltech-UCSD Birds-200-2011 Dataset," Technical Report, 2011, 8 pages.

Wang et al., "Multiple Granularity Descriptors for Fine-Grained Categorization," Proceedings of the IEEE International Conference on Computer Vision (ICCV), Dec. 2015, pp. 2399-2406.

Wang et al., "Residual Attention Network for Image Classification," Proceedings of the IEEE Conference on Computer Vision and Pattern Recognition (CVPR), Jul. 2017, pp. 3156-3164.

Xie et al., "Differentiable Top-k with Optimal Transport," Advances in Neural Information Processing Systems, 2020, 12 pages.

Xie et al., "Reparameterizable subset sampling via continuous relaxations," Proceedings of the Twenty-Eighth International Joint Conference on Artificial Intelligence, 2019, 7 pages.

Xie et al., "Self-Training With Noisy Student Improves ImageNet Classification," Proceedings of the IEEE/CVF Conference on Computer Vision and Pattern Recognition (CVPR), Jun. 2020, pp. 10687-10698.

Xu et al., "Show, Attend and Tell: Neural Image Caption Generation with Visual Attention," Proceedings of the 32nd International Conference on Machine Learning, 2015, 10 pages.

Yang et al., "Learning to Navigate for Fine-grained Classification," Proceedings of the European Conference on Computer Vision (ECCV), Sep. 2018, pp. 420-435.

Yang et al., "Stacked Attention Networks for Image Question Answering," Proceedings of the IEEE Conference on Computer Vision and Pattern Recognition (CVPR), Jun. 2016, pp. 21-29.

Zhang et al., "mixup: Beyond empirical risk minimization," arXiv, Apr. 27, 2018, 13 pages.

Zhang et al., "Picking Deep Filter Responses for Fine-Grained Image Recognition," Proceedings of the IEEE Conference on Computer Vision and Pattern Recognition (CVPR), Jun. 2016, pp. 1134-1142.

Zheng et al., "Learning Multi-Attention Convolutional Neural Network for Fine-Grained Image Recognition," Proceedings of the IEEE International Conference on Computer Vision (ICCV), Oct. 2017, pp. 5209-5217.

Zoph et al., "Rethinking Pre-training and Self-training," Advances in Neural Information Processing Systems, 2020, 13 pages.

\* cited by examiner

END-TO-END TRAINING OF NEURAL NETWORKS FOR IMAGE PROCESSING

CROSS-REFERENCE TO RELATED APPLICATIONS

This application claims priority to U.S. Provisional Application No. 63/119,559, filed on Nov. 30, 2020 and to U.S. Provisional Application No. 63/164,996, filed on Mar. 23, 2021. The disclosure of the prior applications are considered part of and are incorporated by reference in the disclosure of this application.

BACKGROUND

This specification relates to training neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that is configured to train a neural network to process an image and to generate a prediction about the image.

To generate the prediction about the image, the neural network can generate a set of first image patches of the image, and process each first image patch to generate a relevance score representing the relevance of the first image patch for the prediction. The neural network can then process the relevance scores using one or more differentiable operations to identify the k highest relevance scores, and generate a respective second image patch of the image for each identified highest relevance score. The second image patch can, e.g., represent a larger region of the image and/or have a higher resolution than the corresponding first image patch. The neural network can then process the generated second image patches to generate the prediction.

The neural network selects the k highest relevance scores using differentiable operations so that a training system can backpropagate an error in the prediction through the differentiable operations. The training system can then use the backpropagated error to update the network parameters of the neural network that precede the differentiable operations, e.g., using stochastic gradient descent. That is, any neural network layers that precede the differentiable operations (e.g., the neural network layers that generate the relevance scores for the first image patches) can be directly trained using backpropagation because the differentiable operations are differentiable.

The subject matter described in this specification can be implemented in particular embodiments so as to realize one or more of the following advantages.

Using techniques described in this specification, a training system can train a neural network to efficiently process images to generate predictions about the image. The system can train the neural network to process first image patches generated from the image using a relatively computationally-inexpensive first subnetwork (e.g., a scoring subnetwork as described below with reference to FIG. 1) to select the portions of the image that are relevant for the prediction, then process second image patches generated from the relevant portions using relatively computationally-expensive second subnetworks (e.g., an embedding subnetwork and a prediction subnetwork as described below with reference to FIG. 1) to generate the prediction. That is, the neural network can process the entire image using inexpensive computations, then process only a subset of the image using relatively expensive computations. Using some existing techniques, a neural network must process the entire image using computationally-expensive subnetworks because the neural network does now know which portions of the image are relevant for the prediction. Thus, training a neural network as described in this specification can significantly improve the computational, time, and memory efficiency of the neural network.

Using techniques described in this specification, a training system can train a neural network to generate a prediction about an input image in an end-to-end fashion. That is, the training system can generate a respective parameter update for each subnetwork of the neural network concurrently. In particular, by using differentiable operations to select the highest relevance scores for respective first image patches of the input image, the training system can backpropagate gradients generated according to an error in the predictions of the neural network to any subnetwork preceding the differentiable operations in the neural network. Some existing techniques programmatically determine the highest relevance scores for image patches of an input image using non-differentiable operations, and therefore cannot backpropagate gradients through the operations. Some such existing techniques update the parameters of subnetworks preceding the non-differentiable operations using approximated gradients. These approximated gradients can be less accurate than gradients computed directly by backpropagating through differentiable operations, and yield parameter updates that less accurately reflect the errors in the predictions of the neural network. Therefore, using techniques described in this specification, a training system can determine trained parameter values that generate more accurate predictions than the existing techniques. Furthermore, the training system can train the neural network in less time, e.g., using fewer training examples, because the parameter updates more accurately reflect the errors in the predictions of the neural network.

Using some existing techniques, after processing image patches that have been determined to be relevant (i.e., the second image patches) in order to generate respective intermediate outputs for the image patches, a neural network must combine the intermediate outputs to generate the prediction by determining the average of the intermediate outputs. That is, the neural network cannot generate the prediction from the intermediate outputs in any other way, e.g., using additional neural network layers. Using techniques described in this specification, a neural network can combine intermediate outputs corresponding to respective second image patches (e.g., embeddings of the second image patches) in more sophisticated ways, allowing the neural network to extract more useful information from each image patch. For example, the neural network can process the embeddings of the image patches using a transformer neural network and/or a recurrent neural network to generate the prediction about the input image. By processing the embeddings using these powerful neural network architectures, the neural network can generate predictions about the input image that are more accurate.

Furthermore, the existing techniques whose predictions are constrained to being an average of intermediate outputs corresponding to respective image patches are constrained in the types of predictions that can be generated. For example, these existing techniques might be able to generate predictions characterizing a prediction class of the input image, but the existing techniques cannot generate predictions that include bounding boxes identifying detected objects in the input image. Using techniques described in this specification, a training system can train a neural network to perform any appropriate machine learning task on an input image; that is, the training techniques described in this specification are not constrained to the same types of predictions as these existing techniques.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system implemented as computer programs on one or more computers in one or more locations that is configured to train a neural network to process an image, i.e., to process the intensity values of the pixels of the image, to generate a network output that characterizes the one or more images.

Figure 1:
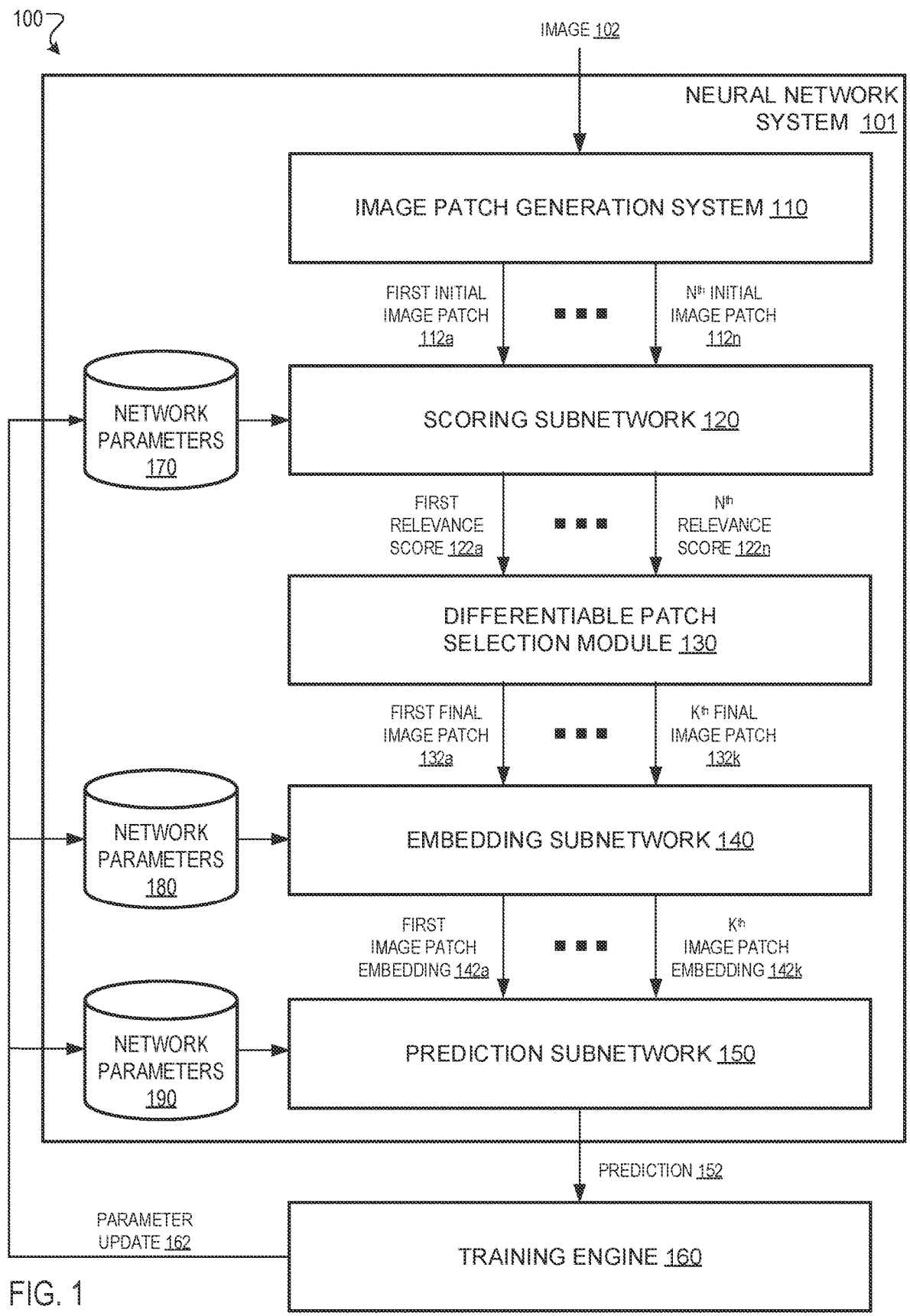
FIG. 1 is a diagram of an example training system.

FIG. 1 is a diagram of an example training system 100. The training system 100 is an example of a system implemented as computer programs on one or more computers in one or more locations, in which the systems, components, and techniques described below can be implemented.

The training system 100 is configured to train a neural network system 101 to process an image 102 and to generate a prediction 152 about the image 102. The neural network system 101 can be configured to perform any appropriate machine learning task using the image 102. Example machine learning tasks are discussed below.

The training system 100 includes a training engine 160 that is configured to update the parameters of the neural network system 101 according to an error in the predictions 152 generated by the neural network system 101.

The neural network system 101 includes an image patch generation system 110, a scoring subnetwork 120, a differentiable patch selection module 130, an embedding subnetwork 140, and a prediction subnetwork 150.

To generate the prediction 152 about the image 102, the image patch generation system 110 generates a set of initial image patches 112a-n that are then processed by the scoring subnetwork 120 to generate a respective relevance score 122a-n for each initial image patch 112a-n. The differentiable patch selection module 130 can then identify the k highest relevance scores from the set of relevance scores 122a-n and generate a respective final image patch 132a-k for each identified highest relevance score, all using differentiable operations. The embedding subnetwork 140 and prediction subnetwork 150 can then process the final image patches 132a-k to generate the prediction 152. As is described in more detail below, the fact that the operations of the differentiable patch selection module 130 are differentiable allows the training system 100 to backpropagate errors through the differentiable patch selection module 130 in order to train the scoring subnetwork 120.

The image 102 can be any appropriate type of image. For example, the image 102 can be a two-dimensional image, e.g., a two-dimensional image that has multiple channels (e.g., an RGB image). As another example, the image 102 can be a hyperspectral image that represents a continuous spectrum of wavelengths, e.g., by identifying, for each pixel in the image 102, a distribution over the spectrum. As another example, the image 102 can be a point cloud that includes multiple points, where each point has a respective coordinate, e.g., in a three-dimensional or a higher-dimensional coordinate space; as a particular example, the image 102 can be a point cloud generated by a LIDAR sensor. As another example, the image 102 can be a medical image generating by a medical imaging device; as particular examples, the image 102 can be a computer tomography (CT) image, a magnetic resonance imaging (MM) image, an ultrasound image, an X-ray image, a mammogram image, a fluoroscopy image, or a positron-emission tomography (PET) image.

Although the below description refers to generating image patches of the image 102 that each include respective "pixels" of the image 102, it is to be understood that the neural network system 101 can generate image patches that include components of the image 102 that are of any appropriate type. For example, if the image 102 is a point cloud, then each image patch of the image 102 can include a subset of the points in the point cloud. As another example, if the image 102 is an MRI image that includes multiple voxels in a three-dimensional voxel grid, then each image patch of the image 102 can include a subset of the voxels in the voxel grid.

As mentioned above, the image patch generation system 110 is configured to process the image 102 and to generate n different initial image patches 112a-n of the image 102, n>1. In this specification, an image patch of an image is a strict subset of the pixels of the image. Images patches of an image can also be called "sub-images" of the image. The initial image patches can also be called "first" image patches.

Generally, each initial image patch 112a-n includes multiple contiguous pixels of the image 102. That is, for each particular initial image patch 112a-n and for any pair of pixels in the particular initial image patch 112a-n, there exists a path from the first pixel of the pair to the second pixel of the pair where the path only includes pixels in the particular initial image patch 112a-n. As a particular example, each initial image patch 112a-n can be a rectangular subset of contiguous pixels of the image 102.

In some implementations, the image patch generation system 110 downscales the image 102 before generating the initial image patches 112a-n. That is, the image patch generation system 110 can reduce the resolution of the image 102 to generate a downscaled image that has fewer pixels than the image 102. For example, the image patch generation system 110 can downscale the image 102 by a factor of n, e.g., where n is 2, 3, 4, 10, or 100. As a particular example, if the image 102 has dimensionality L×W×C, where C represents the number of channels of the image (e.g., C=3 for an RGB image), then the downscaled image can have dimensionality $$\frac{L}{n} \times \frac{W}{n} \times C.$$

By downscaling the image, image patch generation system 110 can improve the efficiency of the neural network system 110, because the scoring subnetwork 120 then does not process the entire image 102. Although the below description generally refers to initial image patches of the image 102 itself, it is to be understood that the same techniques can be applied when using initial image patches of a downscaled version of the image 102.

In some implementations, each pixel in the image 102 is included in exactly one of the initial image patches 112a-n. For example, the image patch generation system 110 can divide the image 102 into a rectangular grid. In some other implementations, one or more initial image patches 112a-n can include the same pixel from the image 102, i.e., two or more of the initial image patches can overlap. Instead or in addition, one or more pixels from the image 102 can be excluded from each of the initial image patches 112a-n, i.e., one or more pixels are not included in any of the initial image patches. As a particular example, the image patch generation system 110 can generate a respective initial image patch 112a-n centered at each pixel in the image 102, e.g., where the initial image patches 112a-n centered at respective pixels each have the same predetermined height and width such that the respective initial image patches 112a-n centered at neighboring pixels are largely overlapping.

The initial image patches 112a-n can be represented in any appropriate way. For example, each initial image patch 112a-n can be represented as a two-dimensional image that includes the pixels of the initial image patch 112a-n, e.g., an image that maintains the spatial relationships of the pixels in the initial image patch 112a-n.

As another example, each initial image patch 112a-n can be represented as a one-dimensional sequence of the pixels of the initial image patch 112a-n. As a particular example, if the initial image patch 112a-n is a two-dimensional region of the image 102, then the initial image patch 112a-n can be a flattened version of the two-dimensional region, e.g., where the pixels of the initial image patch 112a-n are ordered in a one-dimensional tensor according to their respective positions in the image 102. That is, if each initial image patch 112a-n has dimensionality L×W×C, where C represents the number of channels of the image (e.g., C=3 for an RGB image), then the initial image patches 112a-n can be represented by a tensor of dimensionality 1×(L·W·C). As another particular example, if the initial image patch 112a-n includes only pixels that share the same column or row of the image 102 (i.e., if the initial image patch 112a-n is a one-dimensional region of the image 102), then the initial image patch 112a-n can be represented as a one-dimensional sequence that maintains the relative positions of the pixels.

As another example, each initial image patch 112a-n can be represented as an unordered set of the pixels of the initial image patch 112a-n.

Example image patches are described in more detail below with reference to FIG. 2.

In some implementations, instead of generating the initial image patches 112a-n directly from the image 102, the image patch generation system 110 first processes the image 102 to generate an embedding of the image 102 then determines patches 112a-n of the embedding of the image 102. In this specification, an embedding is an ordered collection of numeric values that represents an input in a particular embedding space. For example, an embedding can be a vector of floating point or other numeric values that has a fixed dimensionality.

For example, the image patch generation system 110 can include one or more neural network layers that are configured to generate the embedding of the image 102. As a particular example, the image patch generation system 110 can process the image 102 using one or more convolutional neural network layers to generate a feature map of the image 102. The feature map can have the same dimensionality as the image 102, e.g., the feature map can be two-dimensional if the image 102 is two-dimensional. In some implementations, the feature map has a different number of channels than the image 102; e.g., if the image 102 has three channels (e.g., if the image 102 is an RGB image), the feature map can have more than three channels. The image patch generation system 110 can then determine n patches 112a-n of the feature map of the image 102, where each patch 112a-n includes one or more elements of the feature map. As a particular example, each patch 112a-n can include a single element of the feature map.

In some implementations in which the image patch generation system 110 includes one or more neural network layers, the network parameters of the one or more neural network layers can be trained jointly with the parameters of the other subnetworks of the neural network system 101, as described below. In some other implementations, the one or more neural network layers of the image patch generation system 110 can be pre-trained and frozen during training of the neural network system 101.

The scoring subnetwork 120 is configured to process the initial image patches 112a-n according to a set of network parameters 170 and to generate a respective relevance score 122a-n for each initial image patch 112a-n. The relevance score 122a-n for a particular initial image patch 112a-n represents the relevance of the particular initial image patch 112a-n to the prediction 152 about the image 102. That is, the relevance score 122a-n for a particular initial image patch 112a-n represents a degree to which the information encoded in the pixels of the particular initial image patch 112a-n is useful for performing the machine learning task of the neural network system 101. For example, if the neural network system 101 is configured to perform object detection on the image 102, then a first initial image patch 112a-n that includes pixels depicting an object in the image 102 might have a higher relevance score than a second initial image patch 112a-n that does not depict any object (e.g., a second initial image patch 112a-n that depicts the background of the image 102, e.g., the sky).

The scoring subnetwork 120 can have any appropriate network architecture.

For example, the scoring subnetwork 120 can include one or more feedforward neural network layers that are configured to process a one-dimensional tensor corresponding to a particular initial image patch 112a-n to generate the relevance score 122a-n for the particular initial image patch 112a-n.

As another example, the scoring subnetwork 120 can include one or more convolutional neural network layers that are configured to process a particular initial image patch 112a-n using a convolutional filter to generate the relevance score 122a-n for the particular initial image patch 112a-n. As a particular example, if the initial image patches 112a-n are represented as two-dimensional images, the scoring subnetwork 120 can process each particular initial image patch 112a-n using one or more two-dimensional convolutional neural network layers to generate a feature map of the particular initial image patch 112*a-n*, then generate the relevance score 122*a-n* for the particular initial image patch 112*a-n* based on the feature map.

In some implementations, the scoring subnetwork 120 includes one or more neural network layers that are configured to process multiple different initial image patches 112*a-n* concurrently to generate the respective relevance scores 122*a-n*. For example, one or more initial neural network layers of the scoring subnetwork 120 can process each initial image patch 112*a-n* concurrently to generate a respective embedding of each initial image patch 112*a-n*, e.g., where the embedding for each initial image patch 112*a-n* incorporates information from neighboring initial image patches. One or more subsequent neural network layers of the scoring subnetwork 120 can then process the embedding for each initial image patch 112*a-n* individually to generate the relevance score 122*a-n* for the initial image patch 112*a-n*. As a particular example, the scoring subnetwork 120 can include one or more self-attention neural network layers that are configured to process a sequence that includes each initial image patch 112*a-n* using a self-attention mechanism. Self-attention neural network layers are described in more detail below with reference to the prediction subnetwork 150.

The differentiable patch selection module 130 is configured to process the relevance scores 122*a-n* using one or more differentiable operations to determine the k highest relevance scores from the n relevance scores 122*a-n* and to generate a respective final image patch 132*a-k* of the image 102 corresponding to each of the k highest relevance scores, where k≥1 and k<n. The final image patches can also be called "second" image patches.

The differentiable patch selection module 130 uses differentiable operations to generate the final image patches 132*a-k* so that during training the training engine 160 can backpropagate the error of the prediction 152 through the differentiable patch selection module 130 to the scoring subnetwork 120 in order to update the network parameters 170 of the scoring subnetwork 120. The training process is described in more detail below.

Each final image patch 132*a-k* corresponds to a respective initial image patch 112*a-n* (i.e., an initial image patch 112*a-n* that has one of the k highest relevance scores 122*a-n*). For example, the final image patch 132*a-k* corresponding to any given relevance score 122*a-n* can be the same as the corresponding initial image patch 112*a-n* to which the given relevance score was assigned.

As described above, in some implementations the initial image patches 112*a-n* are generated from a downscaled version of the image 102. In these implementations, the final image patches 132*a-k* can be generated from the original full-scale image 102. That is, each final image patch 132*a-k* can have a higher resolution than the corresponding initial image patch 112*a-n*.

In some implementations, instead of or in addition to having a higher resolution than the corresponding initial image patch 112*a-n*, each final image patch 132*a-k* can represent a larger region of the image 102 than the corresponding initial image patch 112*a-n*. For example, if the corresponding initial image patch 112*a-n* represents a region of the image 102 having dimensionality $L_1 \times W_1 \times C$ (regardless of whether the initial image patch 112*a-n* is downscaled and thus in reality has fewer than $L_1 \times W_1 \times C$ pixels), then the final image patch 132*a-k* can have dimensionality $L_2 \times W_2 \times C$, where $L_1 < L_2$ and $W_1 < W_2$. As a particular example, each final image patch 132*a-k* can have the same center pixel as the corresponding initial image patch 112*a-n*, but include more pixels of the image 102 than the corresponding initial image patch 112*a-n*.

Generating final image patches from a set of relevance scores for initial image patches in a differentiable manner is discussed in more detail below with reference to FIG. 3.

After the differentiable patch selection module 130 generates the k final image patches 132*a-k*, the differentiable patch selection module 130 can provide the final image patches 132*a-k* to the embedding subnetwork 140.

The embedding subnetwork 140 is configured to process the final image patches 132*a-k* according to network parameters 180 to generate a respective embedding 142*a-k* for each of the final image patches 132*a-k*. The embedding subnetwork 140 can be configured through training to generate embeddings 142*a-k* that encode any information in the corresponding final image patches 132*a-k* that is relevant to the prediction 152 about the image 102. The embedding subnetwork 140 can also be called a "feature network" because it is configured to extract features from final image patches 132*a-k*.

The embedding subnetwork 140 can have any appropriate network architecture. For example, the embedding subnetwork 140 can include one or more feedforward neural network layers that are configured to process a one-dimensional tensor corresponding to a particular final image patch 132*a-k* to generate the embedding 142*a-k* for the particular final image patch. As another example, the embedding subnetwork 140 can include one or more convolutional neural network layers that are configured to process a particular final image patch 132*a-k* using a convolutional filter to generate the embedding 132*a-k* for the particular final image patch.

In some implementations, the embedding subnetwork 140 includes one or more neural network layers that are configured to process multiple different final image patches 132*a-k* concurrently to generate the respective embeddings 142*a-k*. For example, one or more neural network layers of the embedding subnetwork 140 can process each final image patch 132*a-k* concurrently; as a particular example, the embedding subnetwork 140 can include one or more self-attention neural network layers that are configured to process a sequence that includes each final image patch 132*a-k* using a self-attention mechanism.

The prediction subnetwork 150 is configured to process the image patch embeddings 142*a-k* according to network parameters 190 to generate the prediction 152. The prediction subnetwork can also be called an "aggregation network" because it is configured to aggregate the k image patch embeddings 142*a-k*.

In some implementations, the prediction subnetwork 150 processes an input sequence determined using the image patch embeddings 142*a-k* using a sequence of one or more self-attention based neural network layers to generate an output sequence. A self-attention neural network layer is a neural network layer that is configured to receive as input a sequence of layer input elements and to apply an attention mechanism over the sequence of layer input elements to generate a sequence of layer outputs elements. In particular, for each particular layer input element, the self-attention neural network layer applies the attention mechanism over the sequence of layer input elements using one or more queries derived from the particular layer input element to generate a respective layer output element.

Each element of the input sequence provided to the sequence of self-attention neural network layers can correspond to a respective image patch embedding 142*a-k*. For example, each element of the input sequence corresponding to a respective image patch embedding 142a-k can be the image patch embedding 142a-k itself.

As another example, each element of the input sequence can include i) the corresponding image patch embedding 142a-k and ii) a positional embedding that represents the position of the corresponding image patch embedding 142a-k in the image 102. In some implementations, the positional embedding corresponding to each image patch embedding 142a-k is an integer, e.g., an index of the corresponding final image patch 132a-k. In some other implementations, the positional embeddings are machine-learned. For example, during the training of the neural network system 101, the training engine 160 can concurrently learn the positional embeddings by backpropagating the error in the prediction 152 through the prediction subnetwork 150 and to the positional embeddings.

In some implementations, one or more of the elements in the input sequence do not correspond to any image patch embedding 142a-k. For example, the input sequence can include a class embedding that is the same for all received images 102. For example, the class embedding can be a tensor having the same dimensionality as the image patch embeddings 142a-k.

The ordering of the elements in the input sequence can be any appropriate ordering. For example, the elements corresponding to respective image patch embeddings 142a-k can be ordered according to the relevance scores 122a-n corresponding to the image patch embeddings 142a-k. As another example, the elements corresponding to respective image patch embeddings 142a-k can be ordered according to the indices of the corresponding initial image patches 112a-n.

Thus, the prediction subnetwork 150 can apply an attention mechanism to the input sequence in order to attend to the embeddings 142a-k of different final image patches 132a-k at different locations in the image 102. It will be understood that the image patch embeddings 142a-k may be processed by the self-attention neural network layers using parallel processing, i.e. at least part of the processing may be performed in parallel.

After the sequence of self-attention neural network layers generates the output sequence, the prediction subnetwork 150 can provide one or more elements of the output sequence to a head subnetwork of the prediction subnetwork 150. For example, the head subnetwork can combine each of the elements of the output sequence generated from the image patch embeddings 142a-k, generating a single combined output. The head subnetwork can then process the combined output to generate the prediction 152, e.g., using one or more feedforward neural network layers. As another example, the head subnetwork can be configured to process only the element of the output sequence corresponding to the class embedding of the input sequence, e.g., using one or more feedforward neural network layers.

In some implementations, the prediction subnetwork 150 includes a recurrent neural network, e.g., a long short-term memory (LSTM) neural network. The recurrent neural network can process a sequence of network inputs, e.g., a sequence generated as described above, to generate a sequence of network outputs. For example, the prediction 152 generated by the prediction subnetwork 150 can be the sequence of network outputs generated by the recurrent neural network, the final network output generated by the recurrent neural network, or a mean of the sequence of network outputs generated by the recurrent neural network.

In some other implementations, the prediction subnetwork 150 combines the embeddings 142a-k of the final image patches 132a-k using a pooling operation to generate the prediction 152, e.g., a mean pooling operation or a max pooling operation.

Generally, the scoring subnetwork 120 can be smaller (e.g., including fewer neural network layers and/or fewer artificial neurons per neural network layer) than the embedding subnetwork 140 and/or the prediction subnetwork 150. Because the scoring subnetwork 120 processes initial image patches 112a-n representing the entire image 102 while the embedding subnetwork 140 and prediction subnetwork 150 process final image patches 132a-k representing only a subset of the image 102, the training system 100 can improve the efficiency of the neural network system 101 by training the scoring subnetwork 120 to be relatively computationally inexpensive when processing the initial image patches 112a-n while saving relatively expensive computations for processing the final image patches 132a-k that have been determined to be relevant for the prediction 152.

In some implementations, the neural network system 101 does not includes the embedding subnetwork 140, and instead the prediction subnetwork 150 is configured to process the final image patches 132a-k directly to generate the prediction 152. For example, the prediction subnetwork 150 can generate an input sequence using the final image patches 132a-k as described above with reference to the image patch embeddings 142a-k, and process the input sequence using one or more self-attention neural network layers and/or one or more recurrent neural network layers.

During training of the neural network system 101, the training system 100 can process training images 102 using the neural network system 101 to generate respective predictions 152 about the training images 102. The training engine 160 can then determine errors in the predictions 152 about the training images 102, and generate a parameter update 162 for the network parameters of the neural network system 101 from the determined errors. For example, the training engine 160 can determine the parameter update 162 using stochastic gradient descent.

The training engine 160 can generate a parameter update 162 for the network parameters 190 of the prediction subnetwork 150, the network parameters 180 of the embedding subnetwork 140, and the network parameters 170 of the scoring subnetwork 120 concurrently.

In particular, the training engine 160 can backpropagate the determined errors through the differentiable patch selection module 130 to generate the parameter update 162 for the network parameters 170 of the scoring subnetwork 120. Backpropagating through the differentiable patch selection module 130 is described in more detail below with reference to FIG. 3.

The training engine 160 can determine the errors in any appropriate way. For example, for each training image 102, the training engine 160 can obtain a ground-truth label that represents the prediction that the neural network system 101 should generate in response to processing the training image 102. The training engine 160 can then generate the parameter update 162 according to a difference between the generated prediction 152 and the ground-truth label for the training image 102. That is, the training engine 160 can generate the parameter update 162 according to a supervised learning procedure.

As another example, the training engine 160 can generate the parameter update 162 according to a reinforcement learning procedure. That is, the training engine 160 can obtain a cost value (or, equivalently, a reward value) from an environment in response to the prediction 152. For example, the image 102 can depict the environment, and the prediction 152 can represent an action to be taken by an agent in the environment. The training engine 160 can then determine the parameter update 162 according to the cost of taking the action in the environment.

As another example, the training engine 160 can generate the parameter update 162 according to an unsupervised or self-supervised learning procedure, e.g., in implementations in which ground-truth labels for the training images 102 are not available.

In some implementations, one or more of the subnetworks of the neural network system 101 are pre-trained. For example, the embedding subnetwork 140 and/or the prediction subnetwork 150 can be pre-trained. That is, before the training engine 160 executes the training procedure described above, initial values for the network parameters 180 of the embedding subnetwork 140 and initial values for the network parameters 190 of the prediction subnetwork 150 can be generated in a separate training procedure. In some such implementations, the network parameters of the pre-trained subnetworks are frozen during training of the neural network system—that is, the training engine 160 does not generate parameter updates 162 to the network parameters of the pre-trained subnetworks (e.g., in implementations in which both the embedding subnetwork 140 and the prediction subnetwork 150 are pre-trained, the training engine 160 can generate a parameter update 162 only for the network parameter 170 of the scoring subnetwork 120). In some other such implementations, the network parameters of the pre-trained subnetworks are fine-tuned during training of the neural network system 101—that is, the training engine 160 does generate parameter updates 162 to the network parameters of the pre-trained subnetworks.

In some implementations, the scoring subnetwork 120 is pre-trained before the training of the neural network system 101. The training engine 160 can fine-tune the network parameters 170 of the scoring subnetwork 120 by backpropagating through the differentiable patch selection module 130 as described above.

In some implementations, the training system trains the neural network system 101 using multi-task learning. That is, the neural network system 101 can include multiple different prediction subnetworks 150 (and, optionally, multiple different embedding subnetworks 140) each corresponding to a respective different prediction task. That is, each prediction subnetwork 150 can generate a respective prediction 152 of a different type about the image 102. The training engine 160 can then determine, for each prediction subnetwork 150, an error in the predictions 152 generated by the prediction subnetwork 150, and backpropagate the errors to the scoring subnetwork 120 as described above.

The neural network system 101 can be configured to generate any appropriate prediction 152 about the image 102.

For example, the neural network system 101 can be configured to process an image 102 to generate a classification output that includes a respective score corresponding to each of multiple categories. The score for a category indicates a likelihood that the image 102 belongs to the category. In some cases, the categories may be classes of objects (e.g., dog, cat, person, and the like), and the image 102 may belong to a category if it depicts an object included in the object class corresponding to the category. In some cases, the categories may represent global image properties (e.g., whether the image 102 depicts a scene in the day or at night, or whether the image 102 depicts a scene in the summer or the winter), and the image 102 may belong to the category if it has the global property corresponding to the category.

As another example, the neural network system 101 can be configured to process an image 102 to generate a regression output that estimates one or more continuous variables (i.e., that can assume infinitely many possible numerical values) that characterize the image 102. In a particular example, the regression output may estimate the coordinates of bounding boxes that enclose respective objects depicted in the image 102. The coordinates of a bounding box may be defined by (x, y) coordinates of the vertices of the bounding box.

As another example, the neural network system 101 can be configured to process an image 102 to generate a relational prediction that characterizes a predicted relationship between one or more portions of the image 102, e.g., a predicted relationship between a first portion of the image and a second portion of the image. For example, the predicted relationship can include a predicted difference between the respective portions of the image 102 and/or a predicted similarity between the respective portions of the image 102.

As another example, the neural network system 101 can be configured to perform a video analysis task. For example, the neural network system 101 can receive multiple images 102 that are video frames of a video, and can process each video frame as described above to generate a respective prediction 152 that characterizes the video frame, e.g., by characterizing whether the video frame depicts a person performing a particular action. In some such implementations, the neural network system 101 can then combine the multiple predictions 152 corresponding to respective video frames to generate a final prediction that characterizes the video. For example, the neural network system 101 can process the respective predictions 152 using a downstream neural network, e.g., a recurrent neural network, to generate the final prediction.

In some implementations, the neural network system 101 can be configured to generate a prediction 152 about multiple different images 102. That is, the image patch generation system 110 can be configured to receive multiple different images 102 and generate respective initial image patches 112$a$-$n$ for each of the multiple different images. The scoring subnetwork 120 can be configured to generate, for each image of the multiple different images 102, respective relevance scores 122$a$-$n$ for the initial image patches 112$a$-$n$ of the image.

The differentiable patch selection module 130 can then generate the k final image patches 132$a$-$k$ using the respective relevance scores 122$a$-$n$ corresponding to each of the multiple different images 102. In some implementations, the differentiable patch selection module 130 can generate a same number of final image patches 132$a$-$k$ for each of the multiple different images 102. That is, if there are m different images 102, then the differentiable patch selection module 130 can generate $$\frac{k}{m}$$

final image patches 132$a$-$k$ for each image 102. For example, the differentiable patch selection module 130 can determine the $$\frac{k}{m}$$

hignest relevance scores for each image 102 separately. In some other implementations, the differentiable patch selection module 130 can generate a different number of final image patches 132*a-k* for each of the multiple different images 102. For example, the differentiable patch selection module 130 can pool all of the relevance scores 122*a-n* for each of the multiple different images 102 into a single set (e.g., a single set that includes m·n relevance scores), and determine the k highest relevance scores from the single set, as described above. Thus, if the relevance scores 122*a-n* for each initial image patch 112*a-n* in a particular image 102 are low (indicating that the particular image 102 does not depict anything relevant for the prediction 152), then the differentiable patch selection module 130 may not generate any final image patches 132*a-k* for the particular image 102.

For example, each of the multiple different images 102 can be different frames of the same video, and the neural network system 101 can be configured to perform a video analysis task on the video by processing each video frame concurrently to generate a single prediction 152 that characterizes the video, e.g., by classifying the video.

Figure 2:
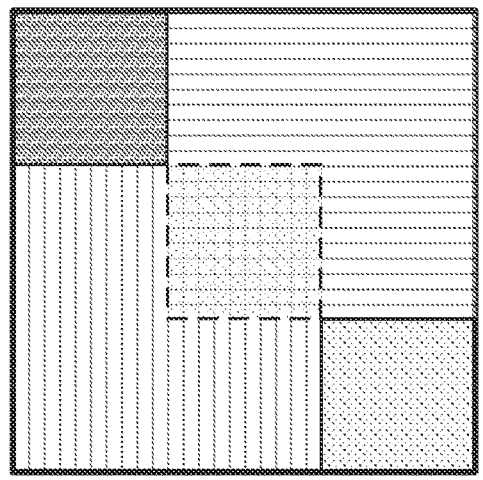
FIG. 2 illustrates example images segmented into image patches.
Figure 2:
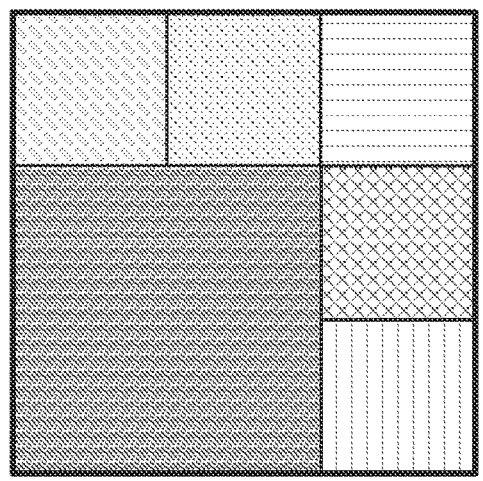
Figure 2:
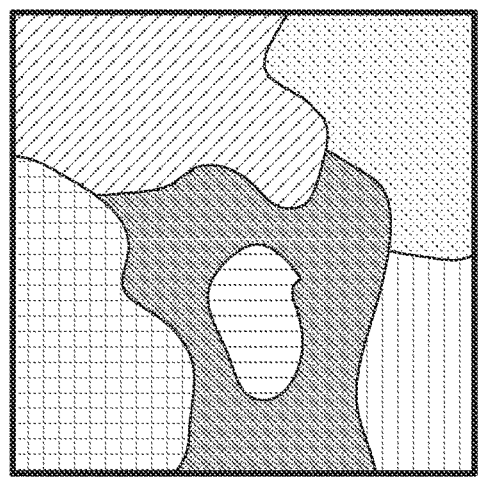
Figure 2:
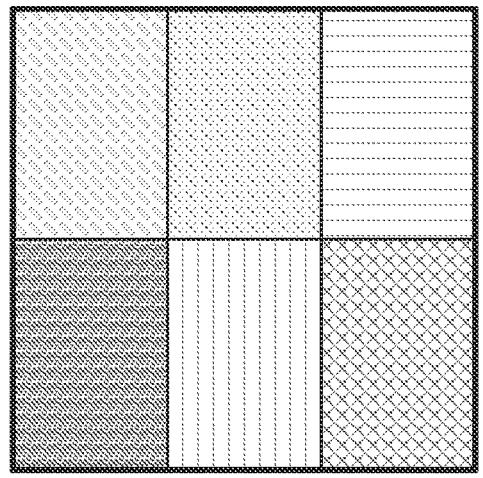
Figure 2:
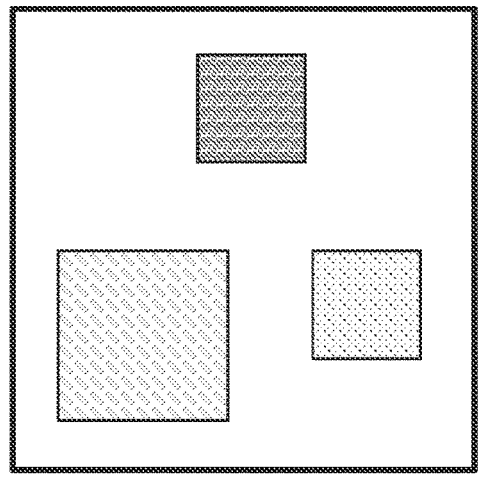

FIG. 2 illustrates example images 210, 220, 230, 240, and 250 segmented into image patches.

The images 210-250 can be provided as input to a neural network system, e.g., the neural network system 101 described above with reference to FIG. 1, that is configured to process the images 210-250 to generate a prediction about the images 210-250. The neural network system can include an image patch generation system, e.g., the image patch generation system 110 described above with reference to FIG. 1, that segments the images 210-250 into multiple image patches. The image patches, can then be processed by a scoring subnetwork as described above to generate the prediction about the images.

The images 210, 220, 230, 240, and 250 depict different possibilities for segmenting images into image patches. In particular, in FIG. 2, each image 210-250 is depicted as segmented into a set of multiple image patches that are each visually distinct, i.e., using different shading or hatching. Generally, an image patch generation system would be configured to segment all received images according to the same schema. That is, the same image patch generation system would not necessarily segment each of the images 210, 220, 230, 240, and 250 as depicted, because the images have been segmented according to different schema.

As depicted in the first image 210, in some implementations, the image patch generation system can generate image patches that each have the same size and shape, e.g., each image patch can be a rectangle. Furthermore, in some implementations, the image patch generation system can segment the first image 210 such that every pixel is a member of exactly one image patch. As a particular example, as depicted in FIG. 2, the image patches can represent a grid of same-sized rectangles. As another particular example, the image patches can represent a grid of same-sized hexagons.

As depicted in the second image 220, in some implementations, the image patch generation system can generate image patches that have different sizes.

As depicted in the third image 230, in some implementations, the image patch generation system can segment the third image 230 such that some pixels are members of multiple different image patches. For example, a first image patch can include a strict superset of the pixels of a second image patch; that is, the second image patch can be entirely enclosed within the first image patch. As a particular example, for each of multiple first image patches determined from an image (e.g., for each first image patch in a grid of first image patches), the image patch generation system can generate a respective second image patch that has the same center pixel but a different size and/or aspect ratio.

As depicted in the fourth image 240, in some implementations, the image patch generation system can segment the fourth image 240 such that some pixels are not members of any image patch. For example, the image generation system can process the fourth image 240 using a machine learning model to identify one or more regions of interest, and the image patch generation system can generate a respective patch for each identified region of interest. For example, the machine learning model can be configured to identify one or more pixels, and the image patch generation system can generate a respective patch centered at each identified pixel.

As depicted in the fifth image 250, in some implementations, the image patch generation system can generate image patches of arbitrary shape. That is, the image patches are not required to be rectangular. For example, the image generation system can process the fifth image 250 using a machine learning model that is configured to segment the fifth image 250, e.g., by assigning each pixel in the fifth image 250 a respective class. The image patch generation system can then generate a respective patch for each contiguous set of pixels that have been assigned the same class by the machine learning model.

Although the images 210-250 are depicted in FIG. 2 as two-dimensional images (or images that are two-dimensional with multiple channels, e.g., RGB images), generally the neural network system can be configured to generate predictions for any type of image, as described above with reference to FIG. 1.

Figure 3:
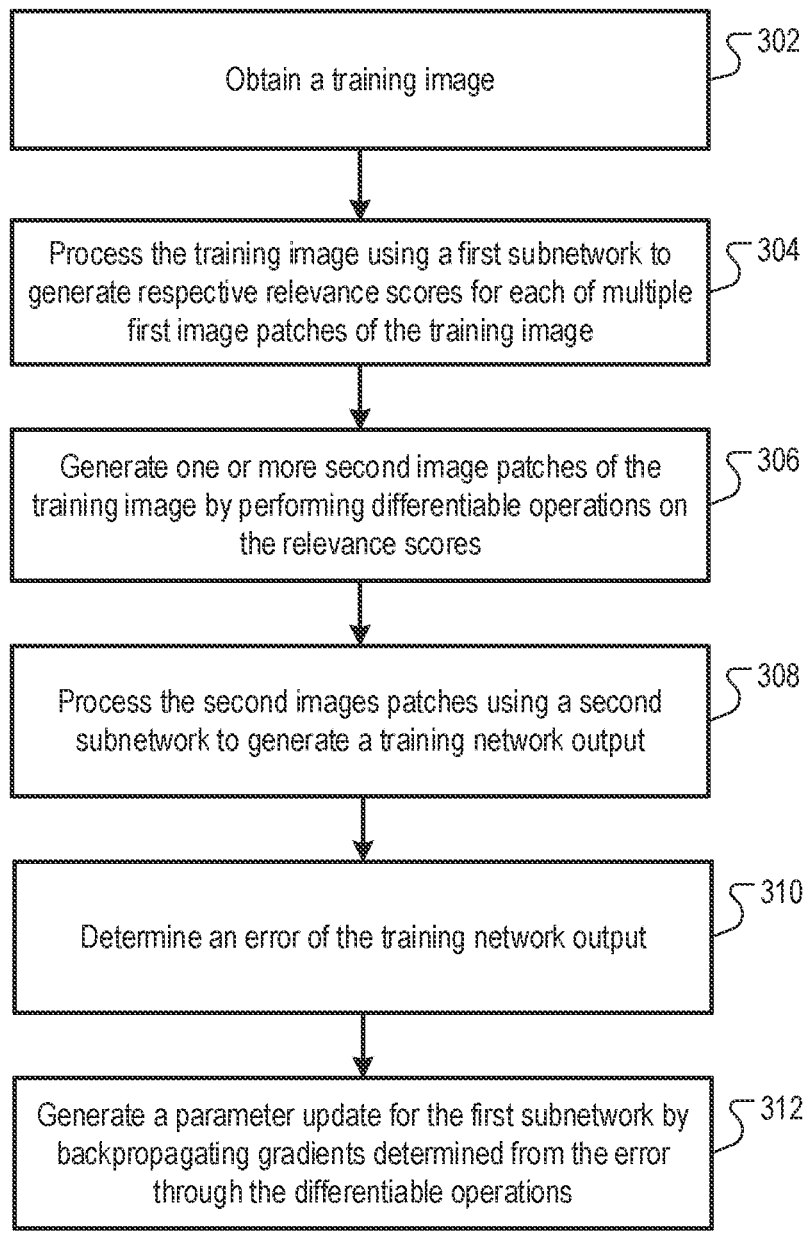
FIG. 3 is a flow diagram of an example process for training a neural network.

FIG. 3 is a flow diagram of an example process 300 for training a neural network. For convenience, the process 300 will be described as being performed by a system of one or more computers located in one or more locations. For example, a training system, e.g., the training system 100 depicted in FIG. 1, appropriately programmed in accordance with this specification, can perform the process 300.

The neural network is configured to process a network input that includes an image and to generate a network output characterizing a prediction about the image, The system obtains a training image (step 302).

The system processes a training network input that includes the training image using a first subnetwork of the neural network to generate a first subnetwork output that includes, for each of multiple first image patches of the training image, a relevance score characterizing a relevance of the first image patch to the prediction about the training image (step 304). For example, the first subnetwork can be the scoring subnetwork 120 described above with reference to FIG. 1.

The system generates, using the relevance scores, one or more second image patches of the training image by performing one or more differentiable operations on the relevance scores (step 306). In particular, the system can determine, from the relevance scores, one or more highest relevance scores, and generate a respective second image patch corresponding to each first image patch that has one of the highest relevance scores. For example, the one or more differentiable operations can be executed by the differentiable patch selection module 130 described above with reference to FIG. 1.

In some implementations, to identify the k highest relevance scores of the n relevance scores in a differentiable manner, the system can solve a linear program defined using the relevance scores to generate a first tensor that identifies the k highest relevance scores. For example, the first tensor can be an (n×k) tensor where each n-dimensional column is a one-hot vector that identifies a respective one of the k highest relevance scores. The system can also determine a second tensor that includes a respective candidate second image patch corresponding to each first image patch, i.e., a second tensor that includes n candidate second image patches. The system can then multiply the first tensor by the second tensor to generate the k second image patches corresponding to the respective first image patches with the highest relevance scores.

For example, the linear program can be of the form:

$$\max_{Y \in C} \langle Y, s1^T \rangle$$

where Y is the first tensor identifying the k highest relevance scores, s is an n-dimensional tensor that includes each of the n relevance scores (e.g., s can be the output of the first subnetwork, e.g., the scoring subnetwork 120), $s1^T$ is a matrix comprising k columns that are each s, $\langle Y, s1^T \rangle$ is an inner product of Y and $s1^T$, C is a set of constraints on Y, and Y includes a respective column for each second image patch, where the column for each second image patch is a one-hot vector identifying an index of s that corresponds to the element of s that defines the relevance score corresponding to the second image patch.

The constraints C on Y can be any appropriate constraints that constrain Y to be a matrix of different one-hot vectors. For example, C can be defined as:

$$C = \left\{ Y \in \mathbb{R}^{N \times K} : Y_{n,k} \geq 0, 1^T Y = 1, Y1 \leq 1, \sum_{i \in [N]} i Y_{i,k} < \sum_{j \in [N]} j Y_{j,k'} \forall k < k' \right\}.$$

The final constraint requires that the one-hot vectors in the columns of Y be ordered by index of the corresponding first image patches. The respective indices of the first image patches can be predetermined in any appropriate way, e.g., according to the respective positions of the first image patches within the image. In other words, for column indices $k_1 < k_2$, the index of the first image patch corresponding to the relevance score identified in column $k_1$ of Y is smaller than the index of the first image patch corresponding to the relevance score identified in column $k_2$ of Y.

As another example, the final constraint can instead require that the one-hot vectors in the columns of Y be ordered by the relevance scores of the corresponding first image patches. That is, for column indices $k_1 < k_2$, the relevance score of the first image patch identified in column $k_1$ of Y is larger (i.e., more relevant) than the relevance score of the first image patch identified in column $k_2$ of Y. For example, the final constraint can be:

$$Y_{k_1} s > Y_{k_2} s \forall k_1 < k_2$$

where $Y_k$ is the $k^{th}$ column of Y.

In some other implementations, instead of directly solving a linear program to identify the k highest relevance scores as described above, the system executes a sorting algorithm on the set of relevance scores generated by the first subnetwork. For example, the system can execute an insertion sort algorithm, a selection sort algorithm, a merge sort algorithm, a heapsort algorithm, or a quicksort algorithm. The output of the algorithm can be a sorted list of the relevance scores, where each relevance score in the sorted list is associated with an identification of the corresponding first image patch. The system can then select the k highest relevance scores from the sorted list, and generate the corresponding second image patches from the image.

In some other implementations, instead of directly sorting the relevance scores and selecting the k highest relevance scores from the sorted list as described above, the system can execute an algorithm that selects the k highest relevance scores from an unsorted list without fully sorting the list, e.g., a quickselect algorithm.

Generating the second image patches without explicitly solving a linear program may be preferable in some implementations, as solving linear programs can take more time and be more computationally expensive than executing a sorting algorithm.

In some implementations, during training of the neural network, the system adds a respective noise term to each relevance score, i.e., adds an n-dimensional noise term to the output s of the first subnetwork. Then, the linear program can be:

$$E_Z \left[ \operatorname*{argmax}_{Y \in C} \langle Y, (s + \sigma Z) 1^T \rangle \right]$$

where σ is a hyperparameter of the neural network, Z is a randomly-sampled n-dimensional noise term, and $E_Z$ is the expectation across all Z values.

Generally, the noise term Z can be drawn from any distribution that has a positive and differentiable density $d\mu(z) \propto \exp(-v(z)) \, dz$. For example, the noise term Z can be a Gaussian noise term. The term v(z) can be any twice-differentiable function. For example, when Z is Gaussian, $v(z) = \frac{1}{2} \|z - \mu\|^2 / 2$.

To compute the above expectation, the system can sample multiple different noise terms Z and generate a respective perturbed set of relevance scores using each noise term Z. The system can then compute a respective initial tensor Y for each set of perturbed relevance scores, e.g., by solving the above linear program or by executing a sorting algorithm on the perturbed relevance scores. The system can then determine the final tensor Y to be the mean of the different initial tensors Y.

Generally, when generating a final tensor Y from multiple different initial tensors Y, each column of the final tensor Y may not be a one-hot vector. Instead, each column of the final tensor Y can be the mean of multiple different one-hot vectors (i.e., the mean of the corresponding columns in the initial tensors Y). Therefore, because the second image patches are determined by multiplying the final tensor Y by a tensor that includes the n candidate second image patches as described above, each second image patch does not represent a single portion of the image, but rather is a mean of multiple different portions of the image.

In some such implementations, at inference time after the neural network has been trained, the neural network determines the argmax of each column of the final tensor Y and updates the final tensor Y so that each column is a one-hot vector identifying the corresponding argmax. That is, the system can ensure that each column of the final tensor Y is actually a one-hot vector and therefore each second image patch is a true image patch of the image, i.e., includes the true values of a subset of the pixels of the image. In some other implementations, at inference time after the neural network has been trained, the neural network does not sample any noise terms at all, and determines the final tensor Y directly from the original relevance scores, as described above.

In some implementations, the system generates each particular second image patch without explicitly performing the matrix multiplication described above, by determining a weighted sum of the n candidate second image patches, where the weights are determined according to the column of the final tensor Y corresponding to the particular second image patch. That is, the system can compute the weighted sums without explicitly multiplying the final tensor Y by a tensor that includes the n candidate second image patches.

In some implementations, the system gradually decays the σ hyperparameter over the course of training the neural network. For example, at each training step of a sequence of training steps, the system can linearly decay the σ hyperparameter to zero. When σ=0, the expectation expression above yields a final tensor Y for which each column of the tensor Y is truly a one-hot vector.

The system processes the one or more second image patches using a second subnetwork of the neural network to generate a training network output characterizing the prediction about the training image (step 308). For example, the second subnetwork can include the embedding subnetwork 140 and the prediction subnetwork 150 described above with reference to FIG. 1.

The system determines an error of the training network output (step 310).

The system generates a parameter update for the first subnetwork (and, optionally, the second subnetwork), including backpropagating gradients determined according to the error of the training network output through i) the second subnetwork, ii) the one or more differentiable operations, and iii) the first subnetwork (step 312).

As described above, in some implementations, to make the one or more differentiable operations be differentiable, the system models the generation of the second image patches as a linear program of the form:

$$E_Z\left[\operatorname*{argmax}_{Y \in C} \langle Y, (s + \sigma Z)1^T \rangle\right]$$

Regardless of how the system computes the above expectation expression (i.e., whether the system actually computes the linear program or instead executes a sorting algorithm as described above), the system can cache (i) each of the sampled noise terms Z and (ii) the initial tensor Y corresponding to each noise term Z. The system can then use these cached values to backpropagate the errors in the training network output through the one or more differentiable operations to the first subnetwork.

In particular, to backpropagate through the above expectation expression, the system can determine the Jacobian $J_s Y$ of the final tensor Y with respect to the outputs of the first subnetwork.

Generally, for Z sampled from any appropriate distribution, the system can compute the Jacobian by computing:

$$E_Z\left[\operatorname*{argmax}_{Y \in C} \langle Y, (s + \sigma Z)1^T \rangle \nabla_z v(Z)^T / \sigma\right]$$

When Z is sampled from a Gaussian distribution, the system can compute the Jacobian by computing:

$$J_s Y = E_Z\left[\operatorname*{argmax}_{Y \in C} \langle Y, (s + \sigma Z)1^T \rangle (Z)^T / \sigma\right]$$

When each sampled noise term Z is cached along with the corresponding initial tensor $$Y = \operatorname*{argmax}_{Y \in C} \langle Y, (s + \sigma Z)1^T \rangle,$$

the above expression within the brackets can be computed directly for each noise term Z. The system can thus compute the Jacobian $J_s Y$ by determining the average, across all sampled noise terms Z, of the computed bracketed expressions. Thus, in implementations in which the second image patches are generated by executing a sorting algorithm, the system can train the neural network without ever directly solving a linear program.

The system can repeat steps 302-312 at each of multiple training time steps to train the neural network.

After the neural network has been trained, the neural network can be deployed in an inference environment. For example, the neural network can be deployed on a user device, e.g., a mobile phone, tablet, or laptop; or the neural network can be deployed on a server system, e.g., on the cloud. The neural network can then receive new images and generate predictions about the images according to the trained values for the network parameters of the neural network.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, .e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network.

Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of training a neural network that is configured to process a network input comprising an image and to generate a network output characterizing a prediction about the image, the method comprising, at each of a plurality of training time steps:
   obtaining a training image;
   processing a training network input comprising the training image using a first subnetwork of the neural network to generate a first subnetwork output that comprises, for each of a plurality of first image patches of the training image, a relevance score characterizing a relevance of the first image patch to a prediction about the training image;
   generating, using the relevance scores, one or more second image patches of the training image by performing one or more differentiable operations on the relevance scores, comprising determining, from the relevance scores, one or more highest relevance scores, wherein each second image patch corresponds to a respective first image patch;
   processing the one or more second image patches using a second subnetwork of the neural network to generate a training network output characterizing the prediction about the training image, comprising:
      processing the one or more second image patches using an embedding subnetwork of the second subnetwork to generate a respective embedding for each second image patch; and
      processing the embeddings for the second image patches using a prediction subnetwork of the second subnetwork to generate the training network output, wherein the prediction subnetwork of the second subnetwork is configured to process a sequence of subnetwork inputs comprising the respective embedding for each second image patch to generate the training network output;
   determining an error of the training network output; and
   generating a parameter update for the first subnetwork and the second subnetwork, comprising backpropagating gradients determined according to the error of the training network output through i) the second subnetwork, ii) the one or more differentiable operations, and iii) the first subnetwork.

2. The method of claim 1, wherein generating, using the relevance scores, one or more second image patches of the training image by performing one or more differentiable operations on the relevance scores comprises:
   determining, from the relevance scores, one or more highest relevance scores, wherein each second image patch corresponds to a respective first image patch with a highest relevance score.

3. The method of claim 2, wherein generating the one or more second image patches comprises:
   sorting the relevance scores of the plurality of first image patches of the training image;
   determining, according to the sorting, the one or more highest relevance scores;
   generating a first tensor Y that identifies the one or more determined highest relevance scores;
   determining a second tensor comprising a respective second image patch corresponding to each first image patch in the training image; and
   multiplying the first tensor Y by the second tensor to generate the second image patches corresponding to the first image patches with the highest relevance scores.

4. The method of claim 2, wherein generating the one or more second image patches comprises:
   independently sampling a plurality of different noise tensors;
   for each sampled noise tensor:
      adding the noise tensor to the relevance scores of the plurality of first image patches of the training image to generate noisy relevance scores;
      sorting the noisy relevance scores;
      determining, according to the sorting, the one or more highest noisy relevance scores; and generating a first tensor Y corresponding to the sampled noise tensor, wherein the first tensor Y identifies the one or more highest relevance scores after the noise tensor has been added to the relevance scores;

determining a final tensor to be a mean of the first tensors Y;

determining a second tensor comprising a respective second image patch corresponding to each first image patch in the training image; and multiplying the final tensor by the second tensor to generate the second image patches corresponding to the first image patches with the highest mean noisy relevance scores.

5. The method of claim 4, further comprising, at inference time, computing new relevance scores for a new image and generating a final tensor for the new image, the generating comprising:

independently sampling at inference time a plurality of different noise tensors;

for each sampled noise tensor sampled at inference time, adding the noise tensor sampled at inference time to the new relevance scores for the new image;

computing a respective tensor corresponding to each sampled noise tensor;

determining a mean tensor to be a mean of the computed tensors; and determining the final tensor for the new image to be an argmax of the mean tensor such that each column of the final tensor for the new image is a one-hot vector.

6. The method of claim 4, further comprising, at inference time, the computing new relevance scores for a new image and generating a final tensor from the new relevance scores without sampling noise tensors for the new image.

7. The method of claim 4, wherein backpropagating gradients determined according to the error of the training network output through the one or more differentiable operations comprises:

caching the plurality of different noise tensors and the plurality of tensors Y; and computing, using the cached values, $$J_s Y = E_Z\left[\operatorname*{argmax}_{Y \in C} \langle Y, (s + \sigma Z)1^T \rangle (Z)^T / \sigma \right]$$

wherein σ is a hyperparameter of the neural network, Z represents the randomly-sampled noise tensors, $J_s Y$ is the Jacobian of the final tensor with respect to the first subnetwork output s.

8. The method of claim 1, wherein the prediction subnetwork comprises a transformer neural network that is configured to process the sequence of subnetwork inputs comprising the respective embedding for each second image patch and to generate the training network output.

9. The method of claim 1, wherein:

each second image patch has a same size, resolution, or both as the corresponding first image patch, or each second image patch is larger than the corresponding first image patch.

10. The method of claim 1, wherein the prediction about the image comprises one or more of:

an object detection prediction characterizing one or more detected objects in the image;

a classification prediction characterizing a predicted class of the image; or a relational prediction characterizing a predicted relationship between a plurality of respective portions of the image.

11. A system comprising one or more computers and one or more storage devices storing instructions that when executed by the one or more computers cause the one more computers to perform operations for training a neural network that is configured to process a network input comprising an image and to generate a network output characterizing a prediction about the image, the operations comprising, at each of a plurality of training time steps:

obtaining a training image;

processing a training network input comprising the training image using a first subnetwork of the neural network to generate a first subnetwork output that comprises, for each of a plurality of first image patches of the training image, a relevance score characterizing a relevance of the first image patch to a prediction about the training image;

generating, using the relevance scores, one or more second image patches of the training image by performing one or more differentiable operations on the relevance scores, comprising determining, from the relevance scores, one or more highest relevance scores, wherein each second image patch corresponds to a respective first image patch;

processing the one or more second image patches using a second subnetwork of the neural network to generate a training network output characterizing the prediction about the training image, comprising:

processing the one or more second image patches using an embedding subnetwork of the second subnetwork to generate a respective embedding for each second image patch; and processing the embeddings for the second image patches using a prediction subnetwork of the second subnetwork to generate the training network output, wherein the prediction subnetwork of the second subnetwork is configured to process a sequence of subnetwork inputs comprising the respective embedding for each second image patch to generate the training network output;

determining an error of the training network output; and generating a parameter update for the first subnetwork and the second subnetwork, comprising backpropagating gradients determined according to the error of the training network output through i) the second subnetwork, ii) the one or more differentiable operations, and iii) the first subnetwork.

12. The system of claim 11, wherein generating, using the relevance scores, one or more second image patches of the training image by performing one or more differentiable operations on the relevance scores comprises:

determining, from the relevance scores, one or more highest relevance scores, wherein each second image patch corresponds to a respective first image patch with a highest relevance score.

13. The system of claim 12, wherein generating the one or more second image patches comprises:

independently sampling a plurality of different noise tensors;

for each sampled noise tensor:

adding the noise tensor to the relevance scores of the plurality of first image patches of the training image to generate noisy relevance scores;

sorting the noisy relevance scores;

determining, according to the sorting, the one or more highest noisy relevance scores; and generating a first tensor Y corresponding to the sampled noise tensor, wherein the first tensor Y identifies the one or more highest relevance scores after the noise tensor has been added to the relevance scores;

determining a final tensor to be a mean of the first tensors Y;

determining a second tensor comprising a respective second image patch corresponding to each first image patch in the training image; and multiplying the final tensor by the second tensor to generate the second image patches corresponding to the first image patches with the highest mean noisy relevance scores.

14. The system of claim 13, further comprising, at inference time, the computing new relevance scores for a new image and generating a final tensor from the new relevance scores without sampling noise tensors for the new image.

15. The system of claim 13, wherein backpropagating gradients determined according to the error of the training network output through the one or more differentiable operations comprises:

caching the plurality of different noise tensors and the plurality of tensors Y; and computing, using the cached values, $$J_s Y = E_Z\left[\operatorname*{argmax}_{Y \in C} \langle Y, (s + \sigma Z)1^T \rangle (Z)^T / \sigma \right]$$

wherein σ is a hyperparameter of the neural network, Z represents the randomly-sampled noise tensors, $J_s Y$ is the Jacobian of the final tensor with respect to the first subnetwork output s.

16. One or more non-transitory computer storage media storing instructions that when executed by one or more computers cause the one more computers to perform operations for training a neural network that is configured to process a network input comprising an image and to generate a network output characterizing a prediction about the image, the operations comprising, at each of a plurality of training time steps:

obtaining a training image;

processing a training network input comprising the training image using a first subnetwork of the neural network to generate a first subnetwork output that comprises, for each of a plurality of first image patches of the training image, a relevance score characterizing a relevance of the first image patch to a prediction about the training image;

generating, using the relevance scores, one or more second image patches of the training image by performing one or more differentiable operations on the relevance scores, comprising determining, from the relevance scores, one or more highest relevance scores, wherein each second image patch corresponds to a respective first image patch;

processing the one or more second image patches using a second subnetwork of the neural network to generate a training network output characterizing the prediction about the training image, comprising:

processing the one or more second image patches using an embedding subnetwork of the second subnetwork to generate a respective embedding for each second image patch; and processing the embeddings for the second image patches using a prediction subnetwork of the second subnetwork to generate the training network output, wherein the prediction subnetwork of the second subnetwork is configured to process a sequence of subnetwork inputs comprising the respective embedding for each second image patch to generate the training network output;

determining an error of the training network output; and generating a parameter update for the first subnetwork and the second subnetwork, comprising backpropagating gradients determined according to the error of the training network output through i) the second subnetwork, ii) the one or more differentiable operations, and iii) the first subnetwork.

17. The non-transitory computer storage media of claim 16, wherein generating, using the relevance scores, one or more second image patches of the training image by performing one or more differentiable operations on the relevance scores comprises:

determining, from the relevance scores, one or more highest relevance scores, wherein each second image patch corresponds to a respective first image patch with a highest relevance score.

18. The non-transitory computer storage media of claim 16, wherein generating the one or more second image patches comprises:

independently sampling a plurality of different noise tensors;

for each sampled noise tensor:

adding the noise tensor to the relevance scores of the plurality of first image patches of the training image to generate noisy relevance scores;

sorting the noisy relevance scores;

determining, according to the sorting, the one or more highest noisy relevance scores; and generating a first tensor Y corresponding to the sampled noise tensor, wherein the first tensor Y identifies the one or more highest relevance scores after the noise tensor has been added to the relevance scores;

determining a final tensor to be a mean of the first tensors Y;

determining a second tensor comprising a respective second image patch corresponding to each first image patch in the training image; and multiplying the final tensor by the second tensor to generate the second image patches corresponding to the first image patches with the highest mean noisy relevance scores.

19. The non-transitory computer storage media of claim 18, wherein backpropagating gradients determined according to the error of the training network output through the one or more differentiable operations comprises:

caching the plurality of different noise tensors and the plurality of tensors Y; and computing, using the cached values, $$J_s Y = E_Z\left[\operatorname*{argmax}_{Y \in C} \langle Y, (s + \sigma Z)1^T \rangle (Z)^T / \sigma \right]$$

wherein σ is a hyperparameter of the neural network, Z represents the randomly-sampled noise tensors, $J_s Y$ is the Jacobian of the final tensor with respect to the first subnetwork output s.

20. The non-transitory computer storage media of claim 18, further comprising, at inference time, computing new relevance scores for a new image and generating a final tensor from the new relevance scores without sampling noise tensors for the new image.

\* \* \* \* \*